US008590686B2

(12) United States Patent
Wittholz

(10) Patent No.: US 8,590,686 B2
(45) Date of Patent: Nov. 26, 2013

(54) PULL-TYPE FRICTION CLUTCH WITH INTEGRATED CLUTCH RELEASE DEVICE

(75) Inventor: Jan Wittholz, Grafenheinfeld (DE)

(73) Assignee: ZF Friedrichshafen AG, Friedrichshafen (DE)

(*) Notice: Subject to any disclaimer, the term of this patent is extended or adjusted under 35 U.S.C. 154(b) by 258 days.

(21) Appl. No.: 12/843,337

(22) Filed: Jul. 26, 2010

(65) Prior Publication Data
US 2011/0017566 A1    Jan. 27, 2011

(30) Foreign Application Priority Data

Jul. 27, 2009  (EP) .................................... 09166434

(51) Int. Cl.
*F16D 25/08*  (2006.01)
*F16D 13/71*  (2006.01)

(52) U.S. Cl.
USPC ................ 192/85.52; 192/98; 192/110 B

(58) Field of Classification Search
USPC ........... 192/70.27, 85.51, 85.52, 89.24, 91 A, 192/85.53, 85.54, 85.57, 98, 110 B
See application file for complete search history.

(56) References Cited

U.S. PATENT DOCUMENTS

| 3,912,058 A | * | 10/1975 | Parkins | 192/18 A |
| 4,344,516 A | * | 8/1982 | Kolb | 192/85.52 |
| 4,440,281 A | * | 4/1984 | Hauguth | 192/48.8 |
| 4,456,111 A | * | 6/1984 | Limbacher | 192/85.52 |
| 4,903,806 A | * | 2/1990 | Flotow | 192/85.51 |
| 5,205,387 A | * | 4/1993 | Checa | 192/85.51 |
| 5,273,145 A | * | 12/1993 | Corral et al. | 192/85.52 |
| 5,366,054 A | | 11/1994 | Cooke | |
| 5,609,233 A | * | 3/1997 | Villata | 192/85.52 |

FOREIGN PATENT DOCUMENTS

| DE | 22 17 942 | 11/1972 |
| DE | 197 16 641 | 5/1992 |
| DE | 10 2004 008 0 | 9/2004 |
| WO | WO 92/08063 | 7/1998 |

* cited by examiner

*Primary Examiner* — David D Le
*Assistant Examiner* — Terry Chau
(74) *Attorney, Agent, or Firm* — Cozen O'Connor

(57) ABSTRACT

A pull-type racing clutch has an integrated clutch release device. A piston which can be actuated hydraulically is formed directly by an outer ring of a rolling bearing arrangement.

6 Claims, 1 Drawing Sheet

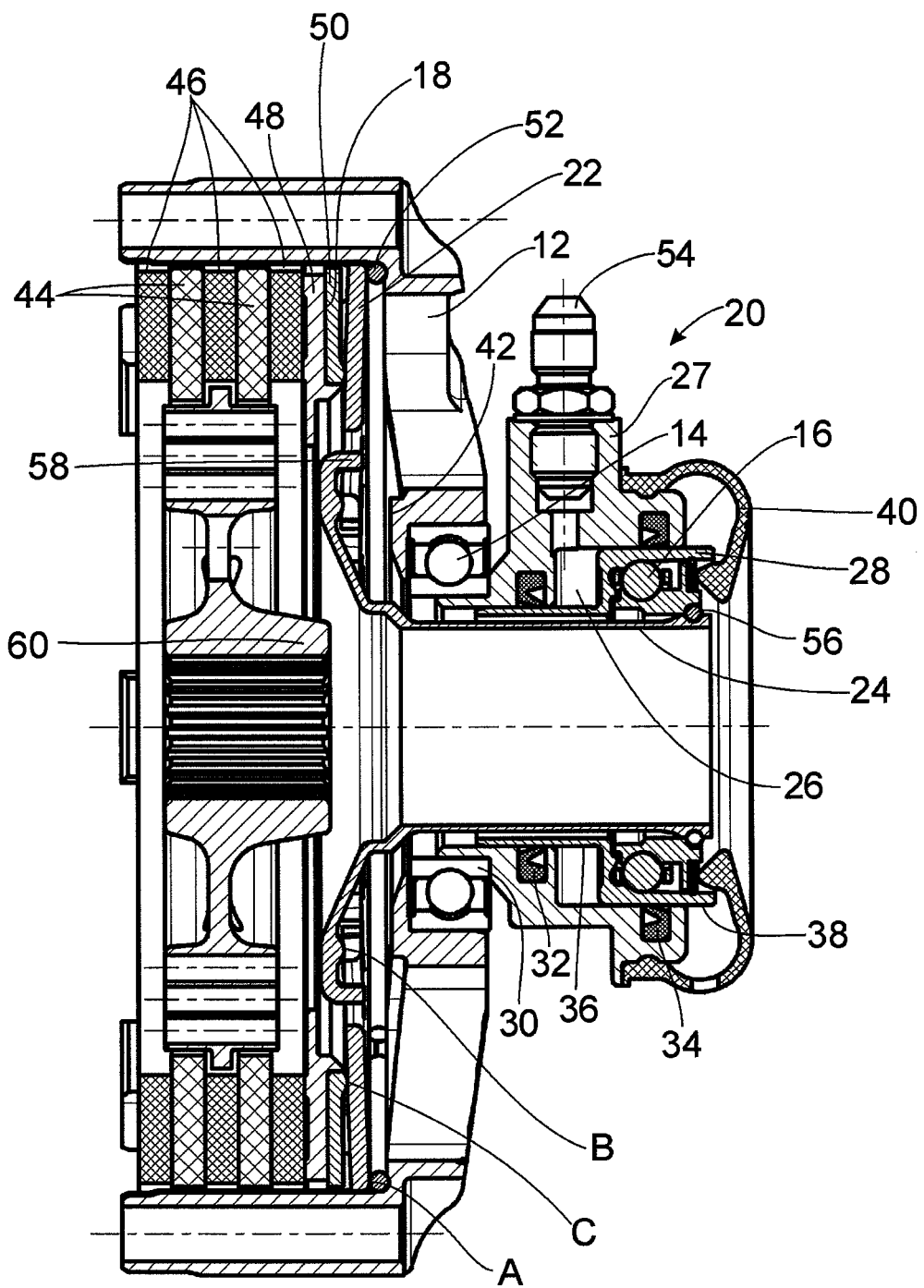

PULL-TYPE FRICTION CLUTCH WITH INTEGRATED CLUTCH RELEASE DEVICE

BACKGROUND OF THE INVENTION

1. Field of the Invention

The invention is directed to a friction clutch that can be used in racing, which has an integrated hydraulic clutch release device. The invention is directed especially to pull-type friction clutches, wherein a spring arrangement is pulled away from the pressure plate rather than pushed in the direction of the pressure plate to disengage the clutch device.

2. Description of the Related Art

Friction clutches are known from DE 10 2004 008 032 A1. In this case, the axial force needed for releasing the clutch is supported inside the friction clutch at the clutch housing so that the releasing process is carried out substantially free from axial forces and the crankshaft bearing of the engine need not absorb any axial forces caused by the actuation of the clutch.

Disadvantages of the known construction are the relatively complicated construction of the clutch and the large volume of pressure fluid needed to release the clutch. In this case, actuation requires a large-volume master cylinder of the actuating system specifically adapted to the clutch device that pushes the needed volume into the integrated slave cylinder of the clutch device when the clutch pedal is actuated.

For racing applications, clutches are frequently changed, and a choice is made between pull-type and push-type clutches for the specific racing application. If the pull-type clutch is simply exchanged for a conventional push-type clutch in vehicles outfitted with the known pull-type clutches and an adapted master cylinder, the spring arrangement of the clutch can be swiveled too far axially because the large-volume dimensioning of the master cylinder is excessive for the push-type clutch, so that the spring arrangement is excessively pressed resulting in damage to the spring arrangement.

SUMMARY OF THE INVENTION

It is the object of the invention to overcome the disadvantages described above and to simplify the clutch construction.

According to one embodiment of the invention, the pressure fluid chamber is defined on the radially outer side and radially inner side directly by the outer ring of the second rolling bearing arrangement. Therefore, the intermediary of a separate structural component part, for example, a ring piston arranged at the second rolling bearing arrangement, can be dispensed with. In this respect, it is advantageous that the radial outer diameter can be limited to the outer radius of the outer ring.

The radial outer diameter of the pressure fluid chamber accordingly corresponds to the outer diameter of the second rolling bearing arrangement. In this way, it is possible to construct the hydraulically acting cross-sectional surface area of the ring piston formed by the outer ring so as to be less than 1500 mm². The hydraulically acting cross-sectional surface area is preferably less than 1300 mm². According to one embodiment of the invention, the hydraulically acting cross-sectional surface area is far below that of known integrated clutch release systems and is accordingly in the range of the hydraulically acting cross-section surface area of slave cylinders of a non-integrated master-slave cylinder system.

In a preferred embodiment form, the clutch release device is supported and centered only by the first rolling bearing arrangement with respect to the clutch housing arrangement, and the clutch release device comprises a non-rotating housing carrying the inner ring of the first rolling bearing arrangement. It is advantageous that the assembly can be carried out relatively simply because the clutch release device has no fixed connection to the clutch housing or transmission housing and is prevented from rotating by the hydraulic connection and the associated connection line. Accordingly, an axial offset or overdetermination is prevented. Therefore, the system can be assembled without difficulty and is quasi self-centering.

In another preferred embodiment form, the clutch release device comprises a non-rotating housing having stationary sealing elements arranged in grooves and which determine the outer radius and inner radius of the surface of the fluid pressure chamber acted upon by pressure. The outer ring of the second rolling bearing arrangement has two outer circumferential surfaces offset by a radial step and guided in a sealing manner at the sealing elements so as to be axially displaceable. The two grooves are preferably arranged in an inner circumferential surface of the housing. In this way, the two axially offset outer circumferential surfaces of the outer ring can be designed so as to be very thin-walled with respect to material thickness and in the form of a sleeve so that the outer radius and inner radius of the surface acted upon by pressure can be minimized. To this end, the outer ring is designed such that a lateral portion that extends toward the radially inner side adjoins the portion of the outer ring having the track for the rolling elements, this lateral portion in turn passes into an axially extending sleeve part which preferably has the same inner diameter as the inner ring of the rolling bearing arrangement.

Another advantageous aspect of the invention is that a first seal surface of the outer ring of the second rolling bearing arrangement extends axially beyond the non-rotating housing when the clutch is fully disengaged, and a cover-like flexible element contacts the housing and that of the second rolling bearing arrangement to protect the seal surface. A second seal surface of the outer ring of the second rolling bearing arrangement is preferably arranged in such that the second seal surface is arranged at least partially radially inside the first rolling bearing arrangement when the clutch is fully engaged.

It is advantageous that the axial installation space requirement is reduced compared to constructions having a housing that covers the entire piston skirt.

The flexible element is preferably formed as a rubber cover and serves to protect the exposed piston surface, i.e., the outer circumference of the outer ring, from soiling, especially from dust from the clutch.

In another advantageous embodiment of the invention, the clutch release ring extends radially outward in the area of the spring arrangement and acts on the spring arrangement on the radially outer side of the rolling bearing arrangements at contact point A.

It is advantageous that the force application radius of the clutch release ring lies closer to the pressure plate so that resiliency in the area of the spring tongues of the spring arrangement has a less pronounced effect on the release path.

According to one embodiment of the invention, the pull-type clutch is constructed such that the spring arrangement indirectly or directly contacts the clutch housing arrangement on the radially outer side at contact point B and contacts the pressure plate between contact points A and B at contact point C.

In a particularly advantageous embodiment, the distance from contact point A to contact point C, distance AC, and the distance from contact point B to contact point C, distance BC, are substantially equal.

Since the spring arrangement at contact point A is swiveled for releasing, this results in an advantageous leverage ratio of 1:2. When the contact point B is moved even farther radially outward in direction of contact point C, there is a short release path which has an advantageously effect on the displacement path of the ring piston because the latter can be kept correspondingly short and the overall axial length of the clutch release device can therefore be further reduced.

While the releasing force increases with a shorter leverage ratio, as does the fluid pressure which must act on the ring piston to release the friction clutch, the release path, on the other hand, is disproportionately reduced because the spring tongues bend less due to the shorter lever arm. The releasing work to be applied is accordingly noticeably reduced compared to the releasing work with greater leverage and lower releasing force because less energy needs to be introduced into the spring tongues without the pressure plate moving.

In a particularly advantageous embodiment of the friction clutch, the spring arrangement indirectly or directly contacts the clutch housing arrangement on the radially outer side at contact point B on a radius between 130 mm and 150 mm, and the distance between contact points A and B is less than 40 mm. It is highly preferable that contact point B lies on a radius between 135 mm and 145 mm and the distance between contact points A and B is less than 36 mm.

In another advantageous aspect of the invention, the clutch housing arrangement has a mechanical stop for limiting the release path arranged in the radial area of the contact point of the clutch release ring at the spring arrangement designed such that the spring arrangement contacts the stop when a predetermined release path is exceeded. In this respect, it is advantageous that an unintentional excessive pressing and bending of the spring arrangement is reliably prevented in case too much pressure fluid volume is pressed into the pressure fluid chamber due to a master cylinder not being adapted to the clutch pedal. Further, a separate device for limiting the release path of the ring piston against which the ring piston would stop can therefore be dispensed with. A stop of this kind for the ring piston would not substantially increase the axial installation space of the clutch release device.

Another advantageous feature of the clutch release ring is that the clutch release ring has axial projections on the radially outer side of the contact point B of the clutch release ring at the spring arrangement, which axial projections engage in at least some of the intermediate spaces between the spring tongues of the spring arrangement. This prevents rotation between the clutch release ring and the spring arrangement. Further, according to the invention, the axial projections of the clutch release ring can extend through the spring tongues and can serve, instead of the spring arrangement, to limit the release path and contact a stop of the clutch housing arrangement when a predetermined release path is exceeded.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in the following with reference to a drawing.

The FIGURE is a cross-section of a clutch device.

DETAILED DESCRIPTION OF THE PRESENTLY PREFERRED EMBODIMENTS

FIG. 1 shows a clutch device for racing which measures 140 mm at the outer diameter of the inner plates of the plate stack. The plate stack comprises the two inner plates 44 and three outer plates 46. The pressure plate 18 is formed of two parts and comprises a base plate 48 and a pressing ring 50. The plate stack is pressed together via the pressing ring 50 by the spring arrangement 22 which is preferably constructed as a diaphragm spring. The diaphragm spring is supported at the radially outer side at a wire ring 52 that contacts the clutch housing 12 and which forms contact point A. The torque transmitted by the engine is transmitted in conventional manner via the rotating clutch housing 12 to the outer plates 46 and from the latter to the inner plates 44 and the hub 60 which is fitted on the transmission input shaft.

The first rolling bearing arrangement, which is preferably constructed as a ball bearing, is arranged at the rotating clutch housing arrangement 12 and supports the non-rotating clutch release device 20 by the inner ring 30. The ball bearing is arranged in a groove which is formed by the housing. The groove is open on one side and forms the supporting surface and an axial stop. The clutch release device 20 comprises a hydraulic connection 54 for pressure fluid which can be hydraulically connected to a master cylinder, not shown, by a pressure line. The pressure fluid is conducted from the hydraulic connection 54 via a duct into the pressure fluid chamber 26 formed as an annular space. The pressure fluid chamber is formed directly by the outer ring 28 of the second rolling bearing arrangement 16 constructed as a ball bearing and by the housing 27 of the clutch release device 20. The clutch release device 20 preferably has two inner circumferential grooves for receiving the sealing elements 32, 34. The sealing elements 32, 34 seal the pressure fluid chamber 26 on the radially outer side and radially inner side. The outer ring 28 is designed such that it has an axial step forming a gradation between a radially outer circumferential surface 38 and a radially inner outer circumferential surface 36. The two outer circumferential surfaces 36, 38 sealingly engage with the two sealing elements 32, 34 and form the two piston walls of the ring piston. The inner ring of the second rolling bearing arrangement 16 is supported axially by a round-wire snap ring 56 arranged in a corresponding groove at the outer circumference of the clutch release ring 24. The pressure fluid chamber 26 has a hydraulically acting pressure surface at the outer ring 28 of about 1300 mm$^2$. This small annular surface ensures that a sufficiently large release path is covered for releasing the clutch in a vehicle with conventional master cylinders having a maximum diameter of 1 inch and a typical ring piston stroke of 18 mm.

The relatively short diaphragm spring tongues also contribute to this; the diaphragm spring extends about 36 mm from contact point A to contact point B. The clutch release ring 24 extends radially outward on its side facing the clutch and contacts contact point B at the diaphragm spring tongues. Further, axial projections 58 of the clutch release ring 24 extend into the intermediate spaces of the diaphragm spring tongues. At maximum release actuation, the diaphragm spring tongues contact the axial stop 42 of the clutch housing arrangement so that excessive pressing of the diaphragm springs is prevented.

A special advantage of the friction clutch according to the invention is the short overall axial length of the clutch release device 20. This is realized in that the piston skirt of the ring piston 28, the outer circumferential surface 38, is not completely enclosed by the housing 27. The piston skirt slides out of the housing 27 axially during disengagement. In order to prevent soiling, a flexible element 40 is sealingly fastened to the housing and is placed over the piston skirt which participates in the axial displacing movement and is supported at the ball bearing 16. The support can be carried out at the non-rotating outer ring and at the rotating inner ring. However, as is disclosed in the FIGURE, the support is preferably carried out at the non-rotating outer ring. The second piston skirt of the outer ring 28 which has the outer circumferential surface 36 is arranged at least in some areas on the radially inner side and in the axial area of the first rolling bearing arrangement 14, at least when the clutch is fully engaged. Through this combination of the projecting piston skirt on the one hand and the second piston skirt sliding in below the first ball bearing on the other hand, the axial extension of the housing 27 is substantially of equal length as the outer ring 28 with its two piston skirts. Further, as concerns the set of problems relating to dust, it is advantageous that the two rolling bearing arrangements 14, 16 are arranged outside the clutch and are shielded from the plate stack by the clutch housing arrangement 12. Accordingly, the two bearings are less exposed to the heat and dirt generated by the plate stack.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A friction clutch comprising:
    a clutch housing arrangement;
    a pressure plate coupled to the clutch housing arrangement so as to be fixed with respect to rotation relative to the clutch housing arrangement and so as to be movable in direction of an axis of rotation;
    an integrated hydraulic clutch release device that is supported axially at the clutch housing arrangement by a first rolling bearing arrangement and comprising a clutch release ring;
    a spring arrangement configured to act on the pressure plate in a direction of clutch engagement, wherein, in order to disengage the friction clutch, the spring arrangement is pulled away from the pressure plate axially at its inner radial area by the clutch release ring, and wherein the clutch release device comprises a second rolling bearing arrangement arranged radially outside the clutch release ring and is axially displaceable with respect to the first rolling bearing arrangement, a sealed pressure fluid chamber into which pressure fluid can be admitted formed between the first and second rolling bearing arrangements, the pressure fluid chamber is defined on a radially inner side by a one-piece outer ring of the second rolling bearing arrangement which forms a ring piston,
    wherein the clutch release device further comprises a non-rotating housing having stationary sealing elements arranged in grooves of the non-rotating housing that determine an outer radius and an inner radius of a surface of the fluid pressure chamber acted upon by pressure, and wherein the outer ring of the second rolling bearing arrangement has two outer circumferential surfaces offset by a radial step and sealingly guided at the sealing elements so as to be axially displaceable,
    wherein a seal surface of the outer ring of the second rolling bearing arrangement extends axially beyond the non-rotating housing when the clutch is fully disengaged, wherein a cover-like flexible element contacts the non-rotating housing and the outer ring of the second rolling bearing arrangement to protect the seal surface.

2. The friction clutch according to claim 1, wherein the clutch release device is supported and centered with respect to the clutch housing arrangement by the first rolling bearing arrangement, and wherein the clutch release device comprises the non-rotating housing that carries the inner ring of the first rolling bearing arrangement.

3. The friction clutch according to claim 1, wherein the clutch release ring extends radially outward in the area of the spring arrangement and acts on the spring arrangement in a vicinity of the radially outer side of the rolling bearing arrangements at a first contact point.

4. The friction clutch according to claim 3, wherein the spring arrangement contacts the clutch housing arrangement one of indirectly and directly on the radially outer side at a second contact point and contacts the pressure plate between the first and second contact points at a third contact point, wherein a distance between the first and third contact points and a distance between the second and third contact points are equal.

5. The friction clutch according to claim 3, wherein the spring arrangement contacts the clutch housing arrangement one of indirectly and directly on a radially outer side at a second contact point on a radius between 130 mm and 150 mm, and the distance between the first and second contact points is less than 40 mm.

6. The friction clutch according to claim 1, wherein the clutch housing arrangement has a mechanical stop configured to limit a release path arranged in a radial area of a contact point of the clutch release ring at the spring arrangement such that the spring arrangement contacts the stop when a predetermined release path is exceeded.

* * * * *